S. NAGY.
AUTOMATIC SHUTTER OPERATING DEVICE FOR PHOTOGRAPHIC APPARATUS.
APPLICATION FILED SEPT. 13, 1916.
1,212,383. Patented Jan. 16, 1917.
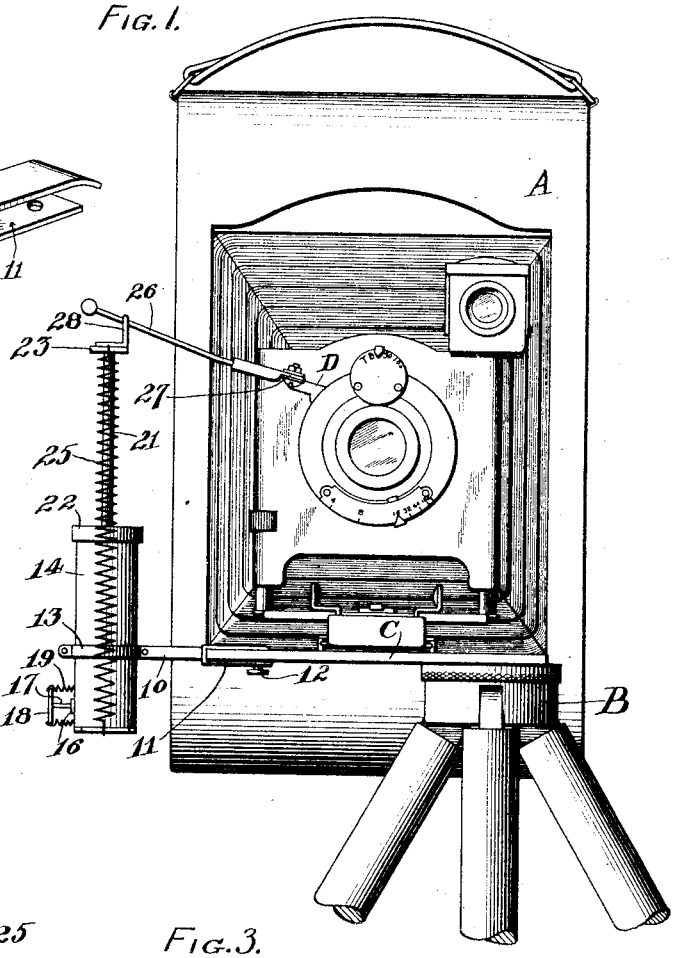
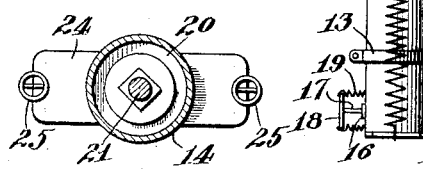
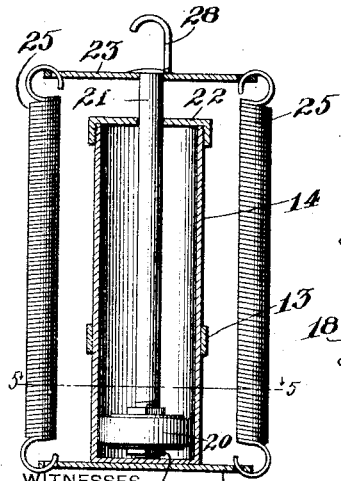
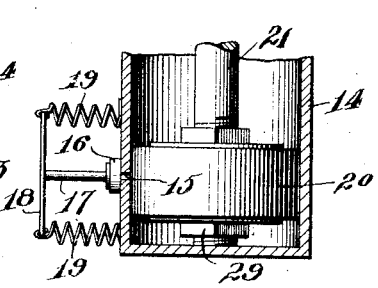
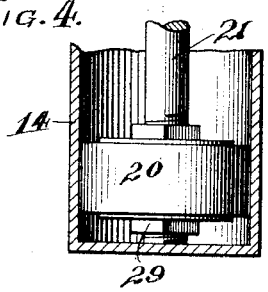
INVENTOR
STEVEN NAGY
BY *Richard Bowen*.
ATTORNEY

UNITED STATES PATENT OFFICE.

STEVEN NAGY, OF NORTHAMPTON, MASSACHUSETTS.

AUTOMATIC SHUTTER-OPERATING DEVICE FOR PHOTOGRAPHIC APPARATUS.

1,212,383. Specification of Letters Patent. Patented Jan. 16, 1917.

Application filed September 13, 1916. Serial No. 119,897.

*To all whom it may concern:*

Be it known that I, STEVEN NAGY, a subject of the Emperor of Austria-Hungary, residing at Northampton, in the county of Hampshire and State of Massachusetts, have invented certain new and useful Improvements in Automatic Shutter-Operating Devices for Photographic Apparatus, of which the following is a specification.

This invention relates to camera shutter operating mechanisms.

The primary object of the invention is to provide new and novel means whereby the camera shutter may be operated, automatically, at predetermined periods, such as will enable the operator to properly focus the camera and, subsequently, take a position in the picture prior to the actuation of the shutter.

Another object of the invention is to provide means whereby the time of actuation of the shutter may be conveniently regulated, to suit the varying conditions. For instance, should the camera be focused at fifteen or twenty feet it would take the operator considerably longer to adjust the camera and then assume a position in the picture than it would if the camera were focused at only five feet.

Still another object of the invention is to provide an improved connection between the shutter and the automatic operating mechanism, such as will admit of manipulation of the shutter independent of the above-named actuating means.

A further object of the invention is to provide for the proper supporting of the actuating means such as will enable the latter to be quickly connected or disconnected to or from the camera, such means being usually in the form of a bracket having a portion straddling the foldable platform of the camera.

A still further object of the invention is to provide a device of the type in question that is extremely simple in construction, strong and durable, and highly practical from both the standpoint of the manufacturer and the standpoint of the user; and which, it is believed, may be manufactured at a comparatively low cost.

These objects are accomplished by such means as are shown in their preferred form in the accompanying drawings, described in the following specification and then more specifically pointed out in the appended claim.

In the accompanying drawings wherein like characters designate like parts throughout the several views:—Figure 1 is a view in front elevation of a kodak of conventional form, the same being equipped with my invention. Fig. 2 is a fragmentary sectional view of a portion of the air chamber of my invention showing clearly, means for regulating the escapement of air therefrom. Fig. 3 is a view in vertical section of the air chamber and its constituent parts. Fig. 4 is a view similar to Fig. 2 with the omission of the means for regulating the escape of air from the air cylinder as shown in Fig. 2. Fig. 5 is a view in top plan of the air cylinder as it appears in Fig. 4, and Fig. 6 is a fragmentary view of a supporting bracket which is attached to the folding platform of the camera and which carries the air cylinder, etc.

In the drawings A designates a camera or kodak of conventional form which is supported upon a tripod B, the camera including a foldable platform C and a shutter actuating arm D. It will be understood of course, that this form of camera has been shown merely for sake of illustration and that my invention is readily applicable to other forms of photographic apparatus.

In reducing my invention to practice I provide a supporting bracket 10 which has arranged at one end, a U shaped portion 11 that is adapted to straddle the foldable platform C of the camera, this latter portion being in turn provided with means such as shown at 12 whereby it may be held against relative movement with respect to the platform. At its other end, and adjacent thereto, the bracket 10 is provided with means as shown at 13, which may be in the form of arcuately curved arms, for supporting the air cylinder 14, the cylinder projecting both above and below the bracket as clearly shown in Fig. 1. In its preferred form, such as shown in Fig. 1, the air cylinder is provided, adjacent its lower end with an escape vent 15 that is normally closed through the instrumentality of a valve 16. Valve 16 is carried upon the stem 17 that in turn carries a transverse plate 18, the latter being normally under tension of the retractile springs 19. A plunger 20 is disposed within the air cylinder and carries a rod 21 that extends upwardly through the detachable cylinder head 22 and supports at its upper end a transversely disposed plate 23. A plate similar to plate 23 is also carried at the lower end of the air cylinder, said plate being designated by the numeral 24 and connected with plate 23 by means of heavier retractile springs 25 which normally retain the piston or plunger 20 in its lowermost position within the air cylinder 14. These retractile springs are heavier than the springs 19 so that the valve 16 will be displaced by the air pressure in the lower part of the air cylinder due to the action of the springs 25 on the plunger.

Actuating portion D of the camera carries a connecting arm 26, the said arm being connected therewith by such means as shown at 27 whereby it may be swung laterally of and folded together with the lens portion of the camera. For engagement with the connecting arm plate 23 is provided with an upstanding hook portion 28, in use, the arm 26 being brought under the hook as shown in Fig. 1. It will be readily seen that the arm may be quickly disengaged from the hook and operated independently thereof in accordance with the desire of the operator.

The downward movement of plunger 20 in cylinder 14 causes a compression of air sufficient to unseat valve 16. However valve 16 and vent 15 may be dispensed with and by adjusting the lower nut 29 of the plunger the compressed air will be allowed to escape about the side of the plunger, as is obvious. If the nut is screwed tightly against the packing of the plunger a very snug engagement is effected between the packing and the inner wall of the cylinder so that the plunger will not move downwardly as quickly as in the case where the nut was loosened considerable.

The operation of my invention is substantially as follows: The camera is focused in the usual way, upon a spot say for instance five yards therefrom and the operator then grasps the transverse plate 23 so as to draw the plunger 20 to its uppermost position in the cylinder and engage hook 28 with arm 26. The operator then assumes his position at the spot upon which the camera has been previously focused and in the meanwhile, under tension of the springs 25, the plunger 20 moves downwardly in the cylinder. The downward movement of the arm 26 causes actuation of the shutter, but not until the operator has had sufficient time to pose for the picture.

From the foregoing it is believed that the advantages and novel features of my invention will be readily understood, and therefore further detailed description is deemed unnecessary.

In reducing the invention to practice, it will be found that the form referred to herein as the most practical and preferred embodiment is the most efficient, but realizing that certain conditions will necessarily vary in concurrence with the adoption of the device, it is emphasized that various minor changes in the details of construction and in the proportion of parts may be resorted to when required without sacrificing any of the advantages of the invention, as defined in the appended claim.

Having thus fully described the invention, what is claimed as new and desired to be secured by Letters Patent is:—

In a device of the character described, the combination with a photographic apparatus including a shutter, of means to actuate said shutter comprising an air cylinder, a plunger operable in said cylinder, a connection between said shutter and said plunger, means to move said plunger in said cylinder, and means carried by said plunger whereby the speed of movement thereof may be varied, substantially as described.

In testimony whereof I affix my signature in presence of two witnesses.

STEVEN NAGY.

Witnesses:
M. E. JONES,
J. REANEY KELLY.

Copies of this patent may be obtained for five cents each, by addressing the "Commissioner of Patents, Washington, D. C."